United States Patent

[11] 3,594,082

[72] Inventor Thomas M. Lonchar
 237 Holmes Drive, Fairborn, Ohio 45324
[21] Appl. No. 846,489
[22] Filed July 31, 1969
[45] Patented July 20, 1971

[54] SLIDE CHANGER FOR AN OVERHEAD PROJECTOR
 8 Claims, 10 Drawing Figs.
[52] U.S. Cl. .................................................. 353/113,
 40/79, 206/16, 353/23, 353/103
[51] Int. Cl. ..................................................... G03b 23/02,
 G03b 1/48
[50] Field of Search .......................................... 353/22, 23,
 24, 103, 104, 113, 114, 118; 40/79, 106.1; 206/16

[56] References Cited
UNITED STATES PATENTS
3,110,217 11/1963 Millner et al. .................. 353/112
2,880,918 4/1959 Schweikhard .................. 206/16
3,352,202 11/1967 Woodrow ....................... 353/118

Primary Examiner—Leonard Forman
Assistant Examiner—Steven L. Stephan
Attorney—Marechal, Biebel, French & Bugg ABSTRACT: A slide changer attachment includes mating case sections pivotally connected by slidable adjustable arms which provide for selectively mounting the attachment on various overhead slide projectors of different widths. An intermediate panel is mounted one of the case sections and supports a sliding feed plate adjacent the bottom of a hopper. The feed plate is connected to an endless belt driven by a reversible motor controlled by a circuit including a manually actuated switch, a set of limit switches and a relay to effect automatic reciprocation of the feed plate.

PATENTED JUL 20 1971
3,594,082
SHEET 1 OF 2
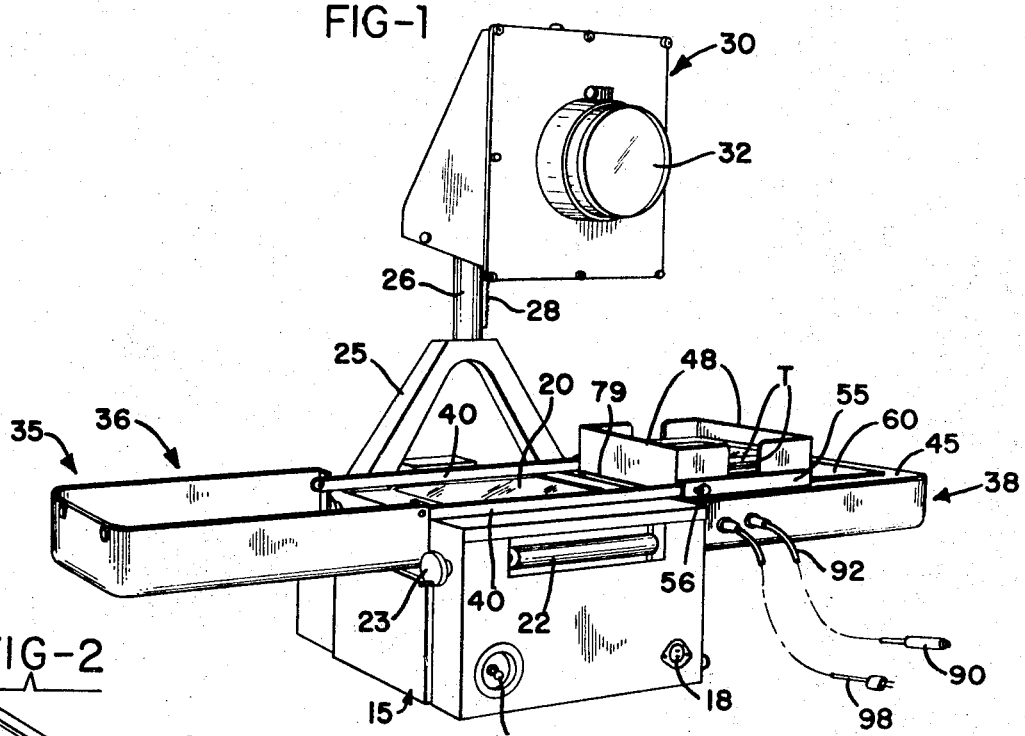
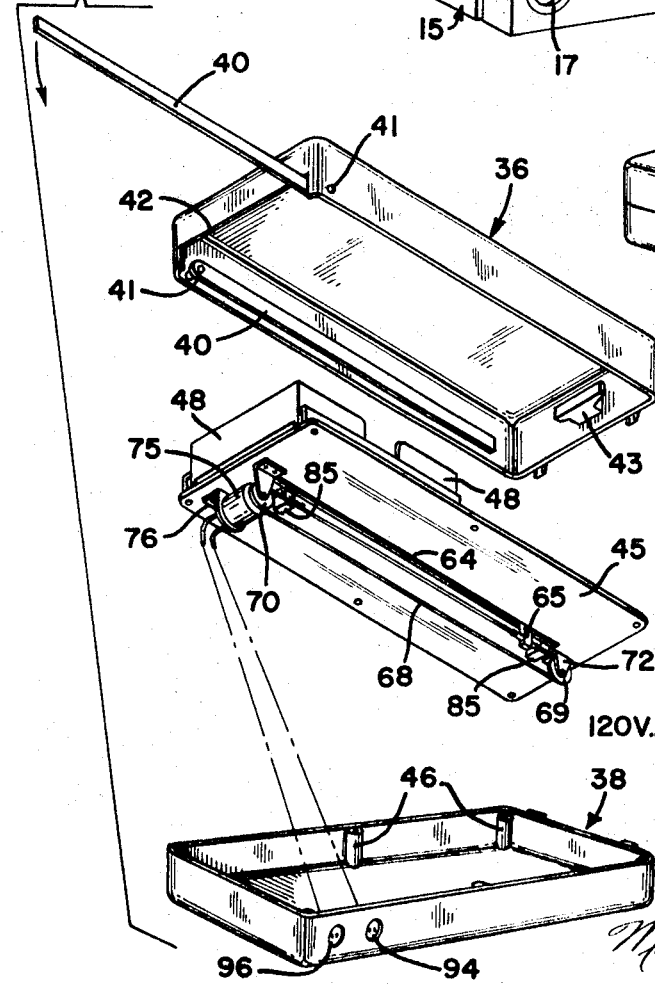
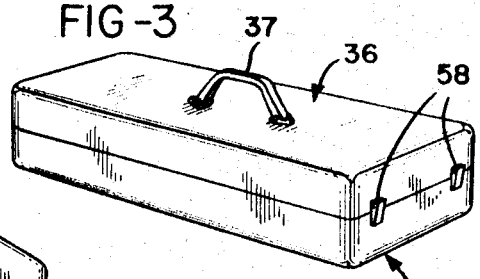
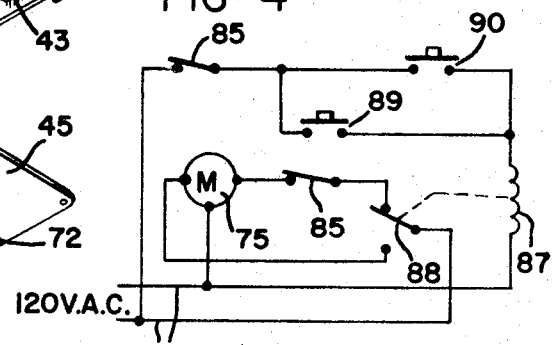
INVENTOR
THOMAS M. LONCHAR
BY
Marechal, Biebel, French & Bugg
ATTORNEYS

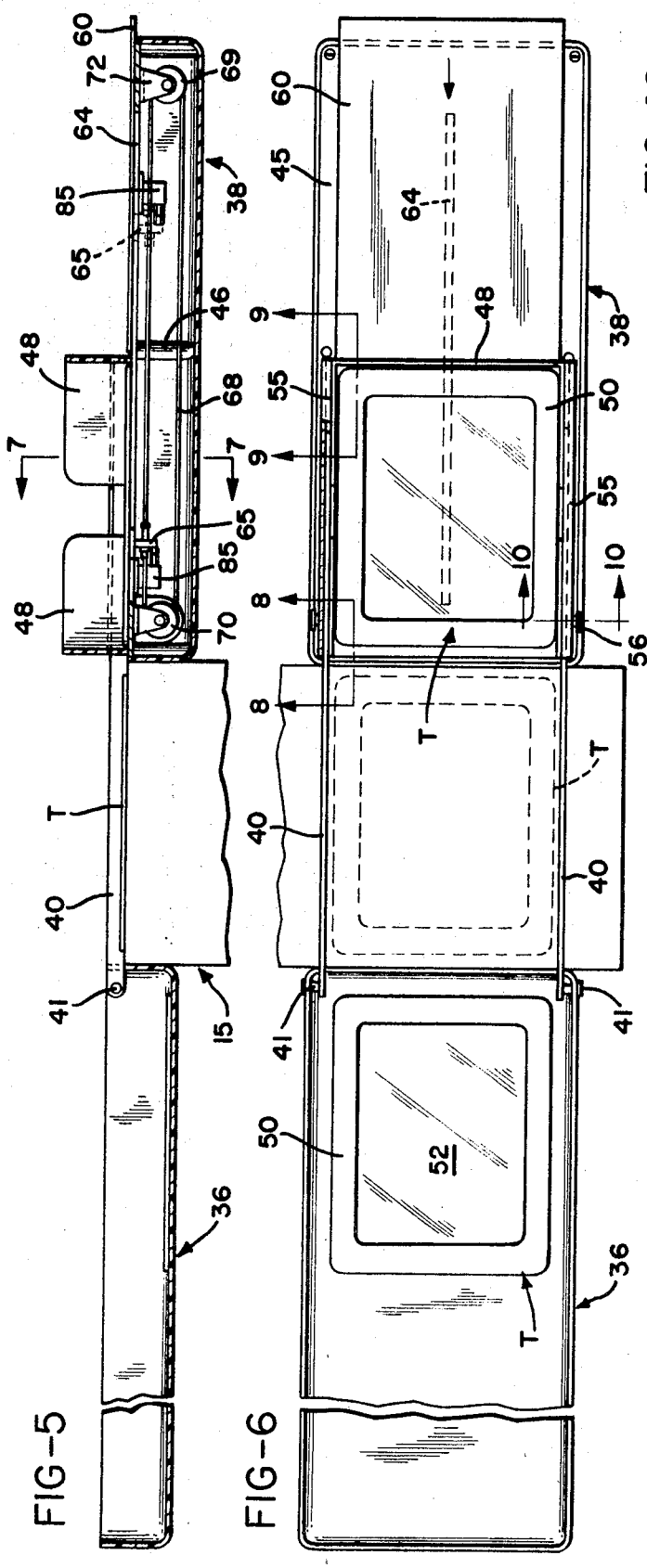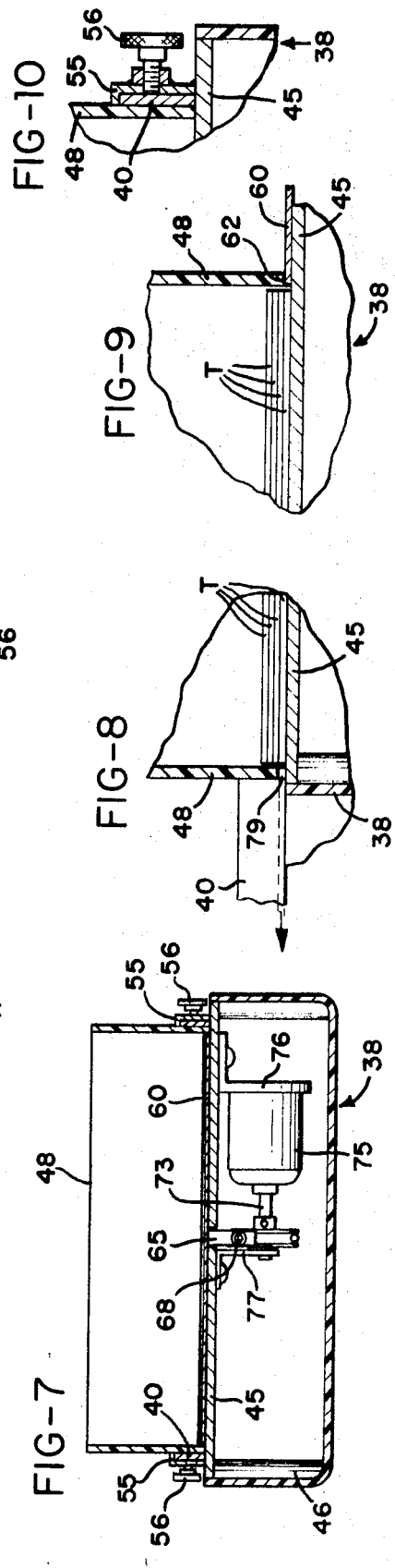

SLIDE CHANGER FOR AN OVERHEAD PROJECTOR

BACKGROUND OF THE INVENTION

An overhead projector commonly includes a light box having a horizontal cover glass, and a lens is positioned above the cover glass for projecting the image of a transparency horizontally onto a remote viewing screen. Usually, each transparency is manually placed on the light box cover glass for viewing the image of a transparency and is manually removed after viewing. Sometimes, a pair of trays or cases are used to maintain a number of transparencies in stacked relation both before and after each transparency is placed on the cover glass.

When it is necessary to view a substantial number of transparencies, the procedure of placing and positioning each transparency on the cover glass for viewing and then removing the transparency becomes quite tiresome and tedious. Accordingly, attempts have been made to construct power-operated slide changers which successively feed a stack of transparencies across the cover glass in a step-by-step manner and into a receiving hopper. One such slide changer is disclosed in U.S. Pat. No. 3,110,217.

It has been found desirable for a slide changer attachment to be constructed so that it can be used with the many different sizes and configurations of overhead projectors available on the market. It is also desirable for the slide changer to be simple and economical in construction and provide dependable service so that it will not jam while showing a series of transparencies.

SUMMARY OF THE INVENTION

The present invention is directed to an improved slide changer adapted to be used as an attachment on essentially all overhead projectors for transparencies. The slide changer is also simple in construction, conveniently collapsible into a compact case for carrying and includes a dependable slide-feeding mechanism which provides for automatic slide changing by remote control.

In accordance with a preferred embodiment of the invention, a slide changer includes two rectangular boxlike case sections hinged together by two parallel spaced arms slidably attached to one of the case sections and are pivotally attached to the other case section. When the case sections are opened to a face up position, they can be adjustably positioned to mount in a straddling manner over the cover glass of an overhead projector. One of the case sections includes an intermediate panel which slidably supports a feed plate adjacent the bottom of a hopper adapted to receive a stack of transparencies.

A bracket extends downwardly from the feed plate through a longitudinally extending slot within the panel and is connected to an endless belt directed around spaced pulleys adjacent the underneath surface of the panel. A reversible motor drives one of the pulleys and is controlled by a circuit including a pair of limit switches actuated by movement of the feed plate and connected to a relay and a pushbutton switch adapted to be actuated by a remote operator. Actuation of the switch causes the feed plate to complete a cycle thereby transferring the bottom transparency within the hopper to a viewing position on the cover glass of the overhead projector and to transfer the previously viewed transparency from the cover glass to the opposite case section which, in effect, forms a hopper for receiving the transparencies after they are viewed and maintaining them in stacked relation.

DESCRIPTION OF THE DRAWINGS

FIG. 1 is a perspective view of an overhead projector provided with a slide changer attachment constructed in accordance with the invention;

FIG. 2 is an exploded perspective view of the slide changer attachment shown in in FIG. 1;

FIG. 3 is a perspective view of the slide changer attachment shown in FIGS. 1 and 2 in its collapsed condition;

FIG. 4 is a schematic wiring diagram showing the electrical components which are employed to actuate the slide changer;

FIG. 5 is a longitudinal section of the slide changer shown mounted on an overhead projector as shown in FIG. 1;

FIG. 6 is a plan view of the slide changer shown in FIG. 1;

FIG. 7 is a section taken generally on the line 7-7 of FIG. 5;

FIG. 8 is a fragmentary section taken generally on the line 8-8 of FIG. 6;

FIG. 9 is a fragmentary section taken generally on the line 9-9 of FIG. 6; and

FIG. 10 is a fragmentary section taken generally on the line 10-10 of FIG. 6.

DESCRIPTION OF THE PREFERRED EMBODIMENT

Referring to FIG. 1, a typical overhead projector includes a base light box 115 which encloses a light source controlled by a switch 17 and supplied with power through a receptacle 18 adapted to receive a power supply cord. A cover glass 20 is located within the top wall of the light box 15, and a pair of front and rear rollers 22 are positioned within the upper portion of the light box 15 for receiving roll film when the projector is used for projecting images of frames on the roll film which is advanced and retracted by cranking corresponding knobs 23.

An inverted V-bracket 25 extends upwardly from the light box 15 and supports a post 26 having a gear rack 28 attached thereto. A head 30 is slidably mounted on the post 26 and is adapted to be adjusted vertically in response to rotation of a knob (not shown) connected to a pinion engaging the rack 28. The head 30 includes a reflector and lens unit 32 which is effective to reflect and project the image of a slide or transparency T (FIG. 6) placed on the cover glass 20 to a remote vertical viewing screen (not shown).

In accordance with the present invention, a slide changer 35 includes an upper rectangular boxlike case section 36 provided with a handle 37 and adapted to mate with a lower rectangular boxlike case section 38. A pair of elongated straplike arms 40 have corresponding ends pivotally connected to a common end of the upper case section 36 by aligned pins 41. The arms 40 extend in parallel spaced relation for pivotal movement between extended positions projecting through a recess 42 in the end wall of the upper case section 36 and retracted positions adjacent the corresponding sidewalls of the upper case section 36. The opposite end wall of the upper case section 36 supports a bracket 43 for storing power supply and control cords as will be explained later.

An intermediate panel 45 is mounted on a series of bosses 46 projecting inwardly from the sidewalls of the lower case section 38 and is secured by a series of screws (not shown). A set of opposing U-shaped vertical wall members 48 extend upwardly from the panel 45 and form a hopper adapted to receive a stack of transparencies T as shown in FIG. 1. Commonly, each transparency T includes a cardboard frame 50 (FIG. 6) supporting a transparent sheet 52 of flexible material having a positive of the wording or pictures to be projected onto the viewing screen. Commonly, the outside measurements of each frame 50 is approximately 10 inches by 12 inches.

A pair of elongated brackets 55 (FIGS. 6, 7 and 10) are secured to the panel 45 and the hopper wall members 48 and define corresponding slots for slidably receiving the arms 40. A thumb screw 56 extends through each of the brackets 55 for clamping the corresponding arm 40 against the adjacent hopper wall member 48. Thus to install or mount the slide changer of the invention on an overhead projector, the upper and lower case sections 36 and 38 (FIG. 3) are released by unlocking a pair of latches 58 (FIG. 3). The upper case section 36 is pivoted to an open position, and the thumb screws 56 are released, and the arms 40 are extended until the case sections abut opposite sides of the light box 15 and the arms 40 rest on the top wall of the light box adjacent the ends of the cover glass 20 as shown in FIG. 1. The thumb screws 56 are then tightened to secure the case sections 36 and 38 in a straddling position relative to the upper portion of the light box 15.

A flat feed member or plate 60 is slidably mounted on the upper surface of the panel 45 and has a forward end portion which is normally received within a slot 62 (FIG. 9) formed within the bottom of the outer hopper wall member 48. A longitudinally extending slot 64 is formed within the center of the panel 45, and an arm 65 (FIG. 7) secured to the underneath surface of the feed plate 60 extends downwardly through the slot 64. The arm 65 is secured to opposite ends of an endless flexible belt 68 of circular cross section and directed around a set of spaced pulleys 69 and 70 positioned adjacent the ends of the slot 64.

The pulley 69 is supported by an L-shaped bracket 72 (FIG. 2) secured to the underneath surface of the panel 45, and the pulley 70 is mounted on the shaft 73 of a reversible electric motor 75 supported by an angle bracket 76 also secured to the underneath surface of the panel 45. Another angle bracket 77 supports the outer end of the shaft 73 adjacent the pulley 70. Thus actuation of the motor 75 is effective to shift the feed plate 60 between a retracted position (FIG. 6) and an extended position (FIG. 5) where the forward end of the feed plate extends to a slot 79 formed within the bottom of the inner hopper wall member 48.

A pair of limit switches 85 (FIG. 5) are mounted on the underneath surface of the panel 45 adjacent the ends of the slots 64 and are adapted to be alternately actuated by the arm 65 secured to the feed plate 60. Referring to FIG. 4, the motor 75 and the limit switches 85 are connected in a circuit including a relay having a coil 87 and a single-pole, double-throw switch 88. A pushbutton normally open switch 89 is mounted on the lower case section 38 and is connected in parallel with another pushbutton normally open switch 90 attached to c... end of a cord 92 (FIG. 1) connected to a receptacle 94 (FIG. 2) mounted within the lower case section 38. Another receptacle 96 (FIG. 2) is mounted within the lower case section 38 for receiving one end of a power supply cord represented by lines 98 in FIG. 4.

After the slide changer is mounted on the projector as described above, and the stack of transparencies T to be viewed are positioned between the hopper wall members 48, the transparencies T are successively fed from the bottom of the hopper by closing either the pushbutton switch 89 or the remote pushbutton switch 90 which energize the motor 75 to advance the feed plate 60 through the slot 62 within the hopper wall 48. As the feed plate 60 advances, the bottom transparency T within the hopper is ejected through the slot 79 (FIG. 8) and onto the cover glass 20 of the light box 15. The feeding of each transparency T onto the cover glass 20 is also effective to feed the previous transparency T into the inverted upper case section 36 as shown in FIG. 6.

When the bracket 65 actuates the inner limit switch 85, the circuit to the relay coil 87 is opened and the relay switch 88 returns to the position shown in FIG. 4 causing the motor 75 to reverse and retract the feed plate 60. When the feed plate 60 reaches its fully retracted position (FIG. 2), the bracket 65 actuates the outer limit switch 85 and opens the circuit to the motor 75 thereby resetting the system for another cycle.

From the drawings and the above description, it is apparent that a slide changer attachment constructed in accordance with the invention provides desirable features and advantages. For example, the connection of the boxlike case sections 36 and 38 by the arms 40 provides a simplified means for adjustably spacing the case sections to accommodate various overhead projectors available on the market and having light boxes of different widths. The slidable mounting of the arms 40 also provides for conveniently collapsing the case sections 36 and 38 into a compact portable case as shown in FIG. 3.

Another important feature is provided by the use of the endless belt 68 and the reversible motor 75 for driving the belt. That is, this mechanism provides for dependable reciprocating movement of the feed plate 60 for successively advancing the transparencies T from the bottom of the hopper defined by the wall members 48. In addition, the circuitry shown in FIG. 4 provides a simplified and reliable means for operating the motor 75 through successive cycles.

The construction of the case sections 36 and 38 and the use of the intermediate panel 45 provides for simplicity in construction and assembly. That is, each of the case sections 36 and 38 is adapted to be conveniently formed or molded from a thermosetting plastic, and all of the internal components can be conveniently mounted on the panel 45 as a subassembly before the panel is secured to the lower case section 38.

While the form of apparatus herein described constitutes a preferred embodiment of the invention, it is to be understood that the invention is not limited to this precise form of apparatus, and that changes may be made therein without departing from the scope of the invention.

What I claim is:

1. An improved slide changer for use as an attachment on an overhead slide projector having two opposed sides, comprising first and second generally rectangular mating case sections adapted to be secured together to form a boxlike case which can be carried when not in use on a projector, said first case adapted to be positioned adjacent one side of the projector and having means forming a first hopper for receiving a stack of slides to be viewed, said second case section adapted to be positioned adjacent the other side of the projector and having means forming a second hopper, means connecting said first and second case sections is spaced relation means for adjusting said connecting means to vary the spacing between said first and second case sections for selectively mounting said changer on various projectors of different widths, a feed member, means supporting said feed member for reciprocating movement between a retracted position relative to said first hopper means and an extended position relative said first hopper means, a drive member positioned below said feed member, means connecting said feed member to said drive member, a motor connected to drive said drive member for reciprocating said feed member, and control means for actuating said motor for successively transferring the slides from said first hopper means to a viewing position on said projector and then to said second hopper means in response to reciprocating movement of said feed member.

2. A slide changer as defined in claim 1 wherein said drive member comprises an endless belt, a set of spaced pulleys positioned under said first hopper means and receiving said belt, a set of limit switches positioned to be actuated in response to movement of said feed member, said motor being reversible and being connected to one of said pulleys, and circuit means including a relay connecting said limit switches to said motor to effect said reciprocating movement of said feed member.

3. A slide changer as defined in claim 1 wherein said connecting means comprise parallel spaced arms, pivot means connecting one end portion of each said arm to one of said case sections, and said adjusting means provides for sliding said arms relative to the other said case section.

4. A slide changer as defined in claim 1 wherein said means supporting said feed member comprise an intermediate panel secured to one of said case sections, wall means projecting upwardly from said panel and cooperating therewith to form a hopper, and said feed member and said motor being positioned below said panel.

5. An improved slide changer for use as an attachment on an overhead slide projector, comprising a pair of mating boxlike case sections, parallel spaced arms each having one end portion pivotally connected to one of said case sections and being slidably attached to the other said case section to provide for selectively mounting said changer in straddling relation on various projectors of different widths, means forming a hopper on one of said case sections for receiving a stack of slides to be viewed, and means for successively feeding the slides from the bottom of said hopper across said projector and into the other said case section.

6. A slide changer as defined in claim 5 wherein said feeding means include a feed member supported for reciprocating movement adjacent the bottom of said hopper, an endless flexible belt positioned below said feed member and connected thereto, a motor connected to drive said belt, and control means for actuating said motor.

7. A slide changer as defined in claim 6 wherein said motor is reversible, and said control means is effective to operate said motor in one direction for a predetermined time and then in the opposite direction to effect automatic extension and retraction of said feed member.

8. An improved slide changer for use on an overhead slide projector having two opposed sides, comprising first hopper means adapted to be positioned adjacent one side of the projector for receiving a stack of slides to be viewed and including a generally flat horizontal panel, means mounted on the upper surface of said panel for defining a hopper chamber, second hopper means adapted to be positioned adjacent the other side of the projector and adapted to receive the slides after they are viewed, means connecting said first and second hopper means and adapted to mount on said projector, a feed member slidably supported on the upper surface of said panel for reciprocating movement between a retracted position and an extended position relative to the bottom of said hopper chamber, a flexible drive belt, means mounted on the underneath surface of said panel and supporting said belt, means connecting said belt to said feed member, a reversible motor mounted on the underneath surface of said panel and connected to drive said belt for reciprocating said feed member, and control means for selectively reversing said motor for successively transferring the slides from said hopper to a viewing position on said projector and then to said second hopper means in response to reciprocating movement of said feed member.